Nov. 24, 1953  H. M. GEYER  2,660,029
DUAL DRIVE ACTUATOR
Filed Dec. 5, 1952
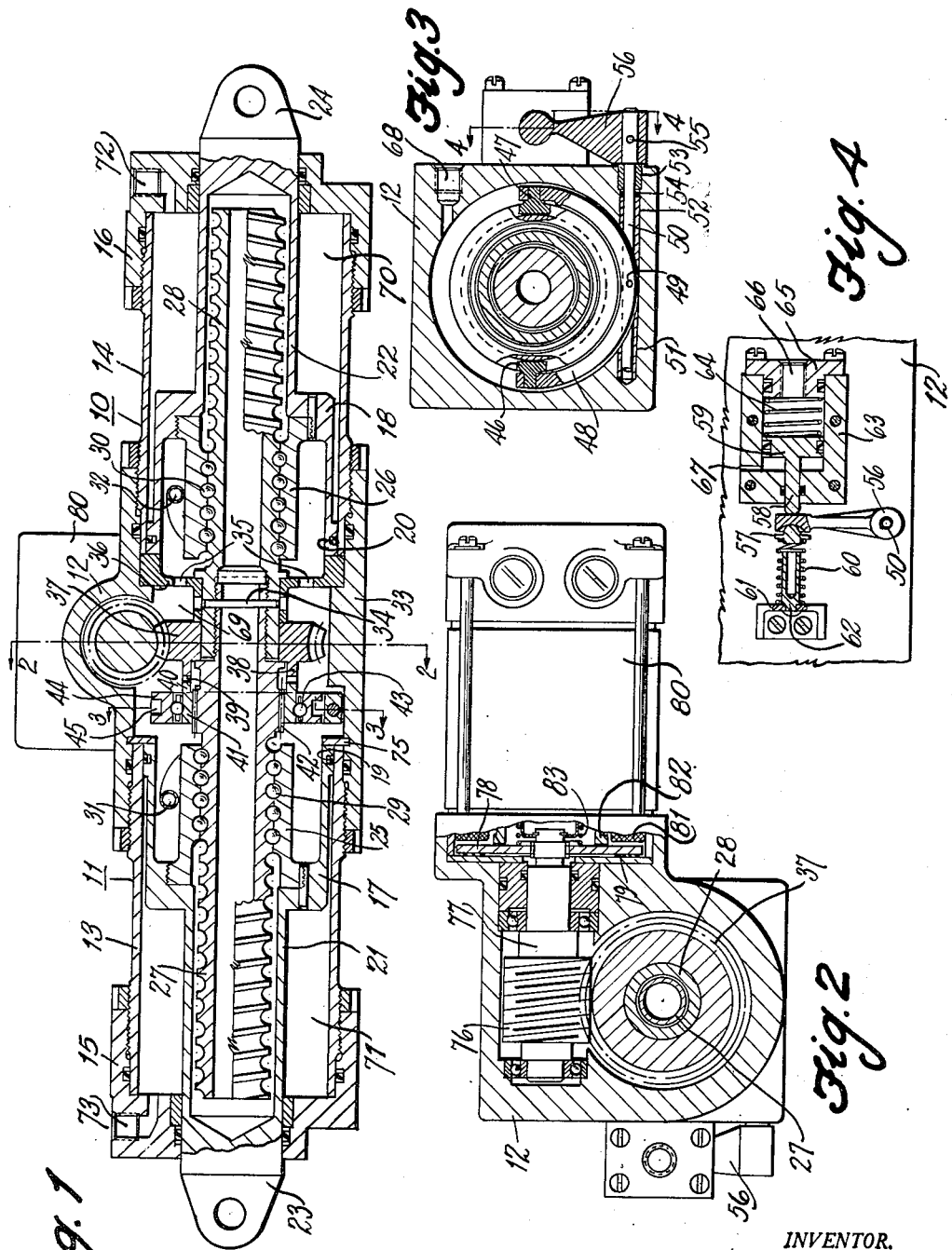
INVENTOR.
HOWARD M. GEYER
BY
ATTORNEYS Patented Nov. 24, 1953

2,660,029

UNITED STATES PATENT OFFICE 2,660,029

DUAL DRIVE ACTUATOR

Howard M. Geyer, Dayton, Ohio, assignor to General Motors Corporation, Detroit, Mich., a corporation of Delaware Application December 5, 1952, Serial No. 324,276

17 Claims. (Cl. 60—6)

The present invention relates to actuators and more particularly to actuators adapted to be operated by two separate motivating means.

In actuators designed for operating control surfaces and other aircraft equipment, the desirability of providing two independent motivating means for operating the actuator is obvious. In addition, aircraft actuators preferably embody releasable locking means, automatically operable to maintain the movable actuator element, and perforce the load device associated therewith at a fixed position when the motivating means are inactive. The instant actuator employs fluid under pressure as a primary motivating means and electro-motive force as the secondary or auxiliary motivating means. The auxiliary motivating means is only utilized if and when the primary motivating means fails or is otherwise rendered inoperative. Accordingly, one of my objects is to provide a locking actuator with primary and secondary means for effecting operation thereof.

The aforementioned and other objects are accomplished in the present invention by releasing the locking means upon actuation of the primary motivating means, and maintaining the locking means locked or effective upon actuation of the auxiliary motivating means. Specifically, the apparatus includes a cylinder having a pair of reciprocally movable pistons therein, the pistons being operatively interconnected so as to move simultaneously in opposite directions upon actuation of either motivating means. Each piston includes a rod that extends through an end wall of the cylinder, one of the rods being adapted for connection to a relatively fixed support and the other of the rods being adapted for connection to a movable load device. Accordingly, upon relative linear movement between the pistons and the cylinder, the position of the load device associated therewith will be altered. The pistons are operatively interconnected so as to move simultaneously in opposite directions during actuator operation by reason of a pair of screw shafts rigidly connected together and having oppositely threaded portions which engage nuts associated with the pistons. The screw shafts and nuts are components of the well known ball-screw and nut assemblies embodied in the actuator whereby relative rotation between the nuts and the screw shafts will occur upon linear movements of the pistons.

In order to achieve the objective of locking the load device in a fixed position when the motivating means are inactive, a ring is connected through straight splines to the screw shafts so as to be movable axially relative thereto, but restrained from rotation relative to the screw shafts. The ring is formed with an axially extending, annular skirt portion having a serrated edge providing clutch teeth. These clutch teeth are engageable with cooperable clutch teeth formed on the edge of a contiguously disposed annular flange integral with a worm gear. The worm gear is journaled for rotation about one of the screw shafts, and is normally restrained from rotation by the inactive auxiliary motivating means. The screw shafts are rotatably journaled within a cylinder housing and extend axially through the pistons. The nuts are rigidly connected to the pistons such that when the locking means are operative or engaged, the pistons cannot move since rotation of the screw shafts is precluded. The pistons and their associated nuts cannot rotate by reason of the rods projecting out of the cylinder for connection to either a load device or a fixed support. The ring is normally spring urged to a position where the locking means, constituted by the co-engaging toothed surfaces of the ring and the worm gear, are engaged. A fluid pressure operated release piston, yoke, and grooved ring assembly are employed to effect longitudinal movement of the ring to thereby release the locking means upon application of fluid pressure to the actuator cylinder.

Upon fluid pressure operation of the actuator, the locking means are preferably released concurrently with the application of pressure fluid to either side of the piston. With pressure fluid acting upon the surfaces of the pistons, linear movement of the pistons in opposite directions may be effected inasmuch as the screw shafts are free to rotate as an assembly relative to the nut and piston assemblies. If for any reason the fluid pressure system should become inoperative, the actuator pistons and load device may be adjusted by operation of the auxiliary motivating means constituted by reversible electric motor. Upon energization of the motor, and while the locking means are engaged or locked, the worm gear, the ring and the screw shafts may be rotated in either direction. Accordingly, relative rotation will occur between the nuts and screw shaft assembly, thereby effecting linear movement of the nut and piston assemblies relative to the cylinder. When the auxiliary motivating means are used to effect actuator operation, the screw shaft assembly is driven through the locking means.

Further objects and advantages of the present invention will be apparent from the following description, reference being had to the accompanying drawing wherein a preferred embodiment of the present invention is clearly shown.

In the drawing:

Fig. 1 is a longitudinal view partly in section and partly in elevation of a dual drive actuator.

Fig. 2 is a view partly in section and partly in elevation, taken along line 2—2 of Fig. 1.

Fig. 3 is a view partly in section and partly in elevation, taken along line 3—3 of Fig. 1.

Fig. 4 is a view partly in section and partly in elevation, taken along line 4—4 of Fig. 3.

With particular reference to Fig. 1, an actuator, designated by the numeral 10, is shown including a cylinder 11 comprising a centrally disposed cylinder housing 12 having oppositely extending cylindrical portions threadedly and sealingly engaging a pair of tubular members 13 and 14 extending in opposite directions, the ends of the tubular member 13 and 14 being closed by end cap members 15 and 16, respectively, which threadedly and sealingly engage the tubular members and form the end walls of the cylinder 11. The tubular members 13 and 14 constitute the side walls of the cylinder 11 within which a pair of opposed pistons 17 and 18, respectively, are disposed. The piston 17 is provided with a seal 19, which insures fluid engagement between the circumferential surface of piston 17 and the inner surface of tubular member 13, while the piston 18 is provided with a seal 20 for a like purpose. The piston 17 also has an integral, axially extending hollow piston rod 21, which extends through end cap 15, the free end of the piston rod 21 having a fixture 23, which is adapted for connection to either a relatively fixed support or a movable load device, not shown. In a similar manner, piston 18 has an integral, axially extending hollow piston rod 22 projecting through end cap 16, the piston rod 22 having a fixture 24, which is adapted for connection to either the load device or the fixed support. Suitable sealing means are provided between the apertured end cap members 15 and 16 and the protruding piston rods 23 and 24.

Both pistons 17 and 18 are generally of cup-shaped configuration and within the cup-shaped portions of these pistons are rigidly connected nuts 25 and 26, respectively. The inner periphery of the nuts 25 and 26 have formed thereon a spiral groove of substantially semi-circular configuration, the grooves in one of the nuts forming a left-hand thread, while the grooves in the other of the nuts form a right-hand thread. It is to be understood that the nuts 25 and 26 may be formed as integral parts of their respective pistons 17 and 18. The nuts 25 and 26 form elements of the ball-screw and nut connection, to be described.

The nut 25 threadedly engages a screw shaft 27 coaxially disposed within the cylinder 11 and extending longitudinally through the piston 17 and into the hollow piston rod 21. The external periphery of the screw shaft 27 is also formed as a spiral groove of substantially semi-circular configuration, the thread being compatible with that of the nut 25. The nut 25 threadedly engages the screw shaft 27 through the agency of a plurality of balls 29, which are allowed to circulate through a tubular passage 31 during relative rotation between the nut and screw shaft. One end of the hollow screw shaft 27 is threadedly connected to one end of a second hollow screw shaft 28. Circumscribing the screw shaft 28 about the threaded connection between the two screw shafts is a member 33, the screw shafts 27 and 28 being connected by a pin 34. The screw shafts are mounted for rotation in member 33, which is clamped in position by the cylinder assembly. The member 33 has an annular row of circumferentially spaced openings 35 for a purpose which will appear more fully hereinafter, the member 33 being rotatably fixed in the cylinder housing 12. The member 33 and the screw shafts 27 and 28 are restrained against longitudinal movement relative to the cylinder 11 by reason of the outer circumferential edge of the member 33 being interposed between an internal shoulder 36 in the housing 12 and the end of tubular member 14. Thus, it is apparent that the member 33 journals the screw shafts 27 and 28 for rotation relative to the cylinder 11, the screw shafts 27 and 28 rotating as an assembly by reason of their interconnection. Thus, it is apparent that inasmuch as the pistons 17 and 18 are to move simultaneously in opposite directions, the threads of screw shaft 27 must be opposite in character to the threads of screw shaft 28, that is one of the screw shafts must have left-hand threads, while other of the screw shafts must have right-hand threads. The screw shaft 28, likewise, has a spiral groove of substantially semi-circular configuration, which threadedly engages the nut 26 through the intermediary of a plurality of balls 30, which circulate through a tubular passage 32 secured to the nut.

The edge of member 33 circumscribing and attached to the screw shafts 27 and 28 abuts one edge of a worm gear 37, the worm gear being journaled for rotation about screw shaft 28 by any suitable bearing means, not shown. The worm gear has an axially extending annular flange 38, the edge of which is serrated to provide a plurality of circumferentially spaced, axially extending clutch teeth 39. Clutch teeth 39 are adapted for engagement with a similar group of circumferentially spaced, axially extending teeth formed on the edge of an axially extending annular flange 40 formed on a ring 41 connected through straight splines 42 to the screw shaft 27. By reason of the straight spline connection between the screw shaft 27 and the ring 41, relative rotative movement therebetween is precluded but relative axial movement therebetween is permitted. The locking means are constituted by the toothed edges of the annular flanges 38 and 40.

The outer periphery of the member 41 is connected through a thrust bearing assembly 43 to a ring 44 having an annular groove 45 therein, the bearing assembly 43 allowing relative rotation therebetween. The ring 44, in essence, constitutes a control ring, the longitudinal position of which determines whether the locking means will be engaged or disengaged. With particular reference to Fig. 3, a pair of diametrically opposed shoe members 46 and 47 are situated within the groove 45. The shoe members 46 and 47 are rigidly attached to the ends of a yoke 48, the intermediary portion of which is pinned at 49 to a shaft 50 journaled by bearing means 51, 52 and 53 within a transversely extending recess in the housing 12. Suitable resilient sealing means 54 also engage the shaft 50 within the recess in housing 12 to prevent the leakage of fluid therefrom. The end of shaft 50 extending out of the recessed housing 12 is pinned at 55 to a lever 56.

Referring more particularly to Fig. 4, the free end of lever 56 is situated between a thrust member 57 and the protruding rod 58 of a lock release piston 59. The thrust member 57 is urged to the right, as viewed in the drawing, by means of a compression spring 60, one end of which is seated against the member 57, and the other end of which seats against the bracket 61 secured by screw devices to the external periphery of the housing 12. A tubular spring guide 62 is attached to the bracket 61 for centering the spring 60 between its seated ends. The lock release piston 59 is disposed within a lock release cylinder 63, likewise, attached to the outer periphery of the housing 12 by screw devices. The piston rod 58 projects through an aperture in one end wall of the lock release cylinder 63 and suitable sealing means are provided therebetween to prevent the leakage of fluid therefrom. The lock release piston 59 sealingly engages the side walls of the cylinder 63 and is normally urged to the left, as viewed in Fig. 4, by means of a compression spring 64 situated between the surface of the piston 59 and the inner surface of an end wall 65 of the cylinder. The end wall 65 is further provided by a lock release port 66 through which pressure fluid may be admitted to effect movement of the lock release piston 59 to the left. A bleed passage 67 is formed in the cylinder adjacent the rod end of the piston to permit the escape of any fluid which may seep by the piston seal. When no fluid pressure is exerted on the lock release piston 59, the opposing springs 60 and 64 center the lever 56 in such a manner that the yoke 48 positions the ring 44 and, hence, the member 41 to effect engagement between the toothed portions of the locking means.

The housing 12, as shown in Fig. 3, has an extend port 68 formed therein which communicates with an extend chamber 69 of the cylinder 11. Thus, it is apparent that the holes 35 in the member 33 are provided to allow the passages of fluid to one surface of the piston 18. Two retract chambers 70 and 71 are provided, respectively, within the tubular members 14 and 13. Retract chamber 71 communicates with retract port 73 formed within cap member 15, while retract chamber 70 communicates with retract port 72 formed within end cap member 16. Preferably, though not necessarily, pressure fluid is admitted concurrently to the lock release cylinder 63 and either the retract chamber 70 and 71, or the extend chamber 69 by any suitable valve means, not shown, such as the type disclosed in copending application, Serial No. 338,348, filed Feb. 24, 1953, which application is a continuation of forfeited application Serial No. 258,938, filed November 29, 1951, in the name of James W. Light.

With particular reference to Fig. 2, the worm gear 37 meshes with a worm 76 which is anchored to a shaft 77 journaled by bearing means within the housing 12. The shaft 77 has attached thereto at one end a disc 78 which is composed of magnetic material and forms a component part of a magnetic clutch to be described. The disc 78 is keyed to the shaft 77 such that relative rotation between the disc and the shaft is precluded, but the disc may move axially relative to the shaft. One side of the magnetic clutch is frictionally engageable with a braking disc 79 secured within a portion of the housing 12. The braking disc is restrained from rotation. A reversible electric motor is disposed within a housing 80 attached to the housing 12. Also disposed within the housing 80 is an electromagnet 81. The construction of the motor and electromagnetic clutch assembly is more particularly disclosed in my copending application, Serial No. 247,737, filed September 21, 1951, now Patent No. 2,620,683, issued December 9, 1952, and suffice it here to say that the rotatable shaft, not shown, of the electric motor has a cup-shaped element 82 attached thereto which is rotatable within the magnetic field established by the electromagnet 81. When the electric motor within the housing 80 is deenergized by any suitable switch means, not shown, the electromagnet 81 is likewise deenergized and a spring 83 will urge the magnetic disc 78 away from the cup-shaped member 82 into frictional engagement with the braking disc 79. Thus, when the motor is deenergized, shaft 77 is restrained against any rotative movement, the shaft 77 thereby preventing rotative movement of the gear 37 within the actuator cylinder at all times when the motor is inactive. Thus, the locking means are rendered operative when the auxiliary motivating means are inactive. When the electric motor and the electromagnet are simultaneously energized, the magnetic field created by the elctromagnet will attract the magnetic disc 78 rotatably secured to the shaft 77, and the disc 78 will move into engagement with the cup member 82 which is being rotated by the electric motor. Rotation of the disc 78 by the cup member 82 will be imparted to the shaft 77 and the screw shafts 27 and 28 through the gear train, constituted by the worm 76 and the worm gear 37, the locking means in the locked condition, and the straight spline connection 42 between ring 41 and the screw shaft assembly.

*Operation*

As heretofore mentioned, fluid under pressure is utilized as the primary motivating means, while the electric motor is only utilized if, and when, the fluid pressure system, not shown, for operating the actuator is rendered inoperative. During fluid pressure operation of the actuator, fluid under pressure is preferably admitted to either the retract or extend actuator chambers concurrently with the admission of pressure to the lock release cylinder 63, while the other actuator chamber or chambers is exposed to drain. When fluid pressure is admitted to a lock release cylinder 63, the lock release piston 59 will move to the left, as viewed in Fig. 4, thereby overcoming the opposing force of spring 60 and rotating the lever and the shaft 50 to the left. Rotation of shaft 50 to the left or in a counterclockwise direction will effect a swinging movement of the yoke by reason of the pin connection 49 therebetween. The swinging movement of the yoke 48 caused by counterclockwise rotation of the shaft 50 will cant the ends of the yoke having shoe members 46 and 47 outwardly with respect to the position it is shown in Fig. 3, thereby effecting movement of the rings 44 and 41 to the left, as viewed in Fig. 1. Movement of the ring 41 and its associated annular flange 40 to the left, which movement is permitted by the straight spline connection 42 will disengage the clutch teeth on the edge of flange 40 from the clutch teeth 39 formed on the flange 38 of the worm gear 37. Accordingly, the shafts 27 and 28 as an assembly are free to rotate in either direction relative to their engaging nuts 25 and 26. Thus, if fluid pressure is admitted to the extend chamber 69, while the retract chambers 70 and 71 are exposed to drain, the pistons 17 and 18 will move concurrently toward their respective end cap members 15 and 16, as viewed in Fig. 1. Linear movement of the pistons 17 and 18 will effect rotation of the screw shafts 27 and 28 as an assembly within the cylinder housing 12.

Conversely, if the extend chamber 69 is exposed to drain while pressure fluid is admitted to the retract chambers 70 and 71, the pistons 17 and 18 will move concurrently in a direction away from end cap members 15 and 16, respectively. Outward movement of the pistons 17 and 18 is limited by engagement between the pistons and the inner surfaces of the respective end cap members. Inward movement of piston 17 is limited by a ring 75 situated in a groove in the housing 12, which the piston 17 is shown abutting in Fig. 1. Inward movement of piston 18 is limited by a shoulder formed on the member 33, which the piston 18 is likewise shown abutting in Fig. 1.

As soon as the valve means, not shown, are actuated to stop the flow of pressure fluid to either of the actuator chambers, the lock release chamber is exposed to drain. When the lock release cylinder is exposed to drain, the oppositely acting springs 60 and 64 will again return the lever 56 to the position it is shown in Fig. 4, thereby effecting movement of the grooved ring 44 and the ring 41 through the yoke 48 to the position it is shown in Fig. 1. The locking means are shown in the engaged position in Fig. 1, that is the teeth of the annular flange 40 are in engagement with the teeth on the annular flange 38. As the worm gear 37 is restrained from rotation when the auxiliary motivating means are inactive, with the locking means in engagement rotation of ring 41 and the screw shafts 27 and 28 is precluded. Accordingly, linear movement of the pistons 17 and 18 is prevented in that no relative rotation can occur between the nuts and the screw shaft assembly, which relative rotation is essential to effect linear movement of the pistons. The pistons 17 and 18 are restrained from rotation by reason of their rods being connected to a fixed support and a movable load device. In the instant design, it is immaterial which of the piston rods is connected to the movable load device, as all hydraulic connections to the actuator cylinder are effected through stationary portions thereof.

Should the fluid pressure system become inoperative for any reason, the actuator piston may be reciprocated by energization of the electric motor. When the motor is energized, the electromagnetic clutch is likewise energized and rotation will be imparted to the shaft 77, which rotation is transmitted through the worm 76 and the worm gear 37 to the screw shaft assembly through the engaged teeth of the locking means. Thus, it is seen that rotation can only be imparted to the screw shaft assembly by the electric motor when the locking means constituted by the toothed portion 36 and the toothed portion 40 are in the locked condition. When the screw shaft assembly is rotated, linear movement of the pistons and nuts as an assembly will be effected by relative rotation between the screw shaft assembly and the nuts, the direction of movement being dependent upon the direction of rotation of the screw shaft assembly constituted by shafts 27 and 28. Thus, a reversible electric motor is conveniently used to effect rotation of the screw shaft assembly in either direction. However, it is to be understood that a unidirectional motor could be used if reversible gearing means were provided.

With an actuator of the present design, it is readily apparent that in the absence of fluid pressure actuation to the cylinder and while electric motor is deenergized, movements of the pistons 17 and 18 relative to the cylinder 11 are prevented by the engaged locking means. When fluid pressure is employed as the motivating means, the locking means must be released to permit rotation of the screw shaft assembly relative to the nut and piston assemblies. However, when the electric motor is used as the motivating means, the locking means must be in the locked or engaged condition to permit rotation of the nut and screw shaft assembly relative to the nut and piston assemblies through the locking means. It is further apparent that reciprocable movement of the pistons within the cylinder can only be effected by relative rotary movement between the screw shaft assemblies and the nuts.

While the embodiment of the present invention as herein disclosed, constitutes a preferred form, it is to be understood that other forms might be adopted.

What is claimed is as follows:

1. A dual drive actuator including, in combination, a cylinder, a pair of lineally movable pistons in said cylinder capable of fluid pressure actuation in either direction, said pistons being operatively interconnected so as to move simultaneously in opposite directions upon actuation thereof, releasable locking means operatively associated with said pistons for holding said pistons against movement when no fluid pressure is exerted upon said pistons, and auxiliary driving means operatively connected to said pistons for effecting linear movements thereof in either direction with the locking means in the locked condition.

2. A dual drive actuator including, in combination, a cylinder, a pair of lineally movable pistons in said cylinder capable of fluid pressure actuation in either direction, said pistons being operatively interconnected so as to move simultaneously in opposite directions upon actuation thereof, releasable locking means operatively associated with said pistons for holding said pistons against movement when no fluid pressure is exerted upon said pistons, and auxiliary means operatively connected to said locking means for effecting linear movements of said pistons in either direction, said auxiliary means, when inactive, maintaining said locking means operative to prevent movement of said pistons and, when active, operative to effect movement of said pistons through said locking means.

3. A dual drive actuator including, in combination, a cylinder, a pair of lineally movable pistons in said cylinder capable of fluid pressure actuation in either direction, said pistons being operatively interconnected so as to move simultaneously in opposite directions upon actuation thereof, locking means operatively associated with said pistons for holding said pistons against movement when no fluid pressure is exerted upon said pistons, means for releasing said locking means upon application of fluid pressure to said cylinder, and auxiliary driving means operatively connected to said pistons for effecting linear movements thereof in either direction with the locking means in the locked condition.

4. A dual drive actuator including, in combination, a cylinder, a pair of lineally movable pistons in said cylinder capable of fluid pressure actuation in either direction, said pistons being operatively interconnected so as to move simultaneously in opposite directions upon actuation thereof, each of said pistons having an element attached thereto projecting through opposite walls of said cylinder for connection to either a relatively fixed support or movable load member, releasable locking means operatively associated with said pistons for holding said pistons against movement when no fluid pressure is exerted upon said pistons, and auxiliary driving means operatively connected to said pistons for effecting linear movements thereof in either direction with the locking means in the locked condition.

5. A dual drive actuator including, in combination, a cylinder, a pair of lineally movable pistons disposed in said cylinder capable of fluid pressure actuation in either direction, said pistons being operatively interconnected so as to move simultaneously in opposite directions, releasable locking means operatively associated with said pistons for preventing movement of said pistons when no fluid pressure is exerted thereon, and auxiliary driving means operatively connected to said pistons for effecting linear movements thereof in either direction in lieu of fluid pressure actuation, the operative connection between said pistons and said auxiliary means including a pair of hollow members attached to said pistons, a pair of interconnected elements rotatably journaled in said cylinder, said elements extending longitudinally through and operatively engaging said hollow members whereby relative rotation will occur between said elements and members upon linear movements of said pistons, and the locking means in the locked condition.

6. A dual drive actuator including, in combination, a cylinder, a pair of lineally movable pistons disposed in said cylinder capable of fluid pressure actuation in either direction, said pistons being operatively interconnected so as to move simultaneously in opposite directions, locking means operatively associated with said pistons for preventing movement of said pistons when no fluid pressure is exerted thereon, means for releasing said locking means upon application of fluid pressure to said cylinder, and auxiliary driving means operatively connected to said pistons for effecting linear movements thereof in either direction in lieu of fluid pressure actuation, the operative connection between said pistons and said auxiliary means including a pair of hollow members attached to said pistons, a pair of interconnected elements rotatably journaled in said cylinder, said elements extending longitudinally through and operatively engaging said hollow members whereby relative rotation will occur between said elements and members upon linear movements of said pistons, and the locking means in the locked condition.

7. An actuator including, in combination, a cylinder, a pair of reciprocally movable pistons disposed in said cylinder capable of fluid pressure actuation in either direction, said pistons being operatively interconnected so as to move simultaneously in opposite directions upon actuation thereof, a pair of members disposed in said cylinders and operatively connected to said pistons, the operative connection between said pistons and members including a pair of elements attached to said pistons and operatively engaging said members whereby relative rotation will occur between said members and elements in response to reciprocative movements of said pistons, releasable locking means operatively connected with said pistons for holding said pistons against movement when no fluid pressure is exerted upon said pistons, and auxiliary driving means operatively connected with said locking means for effecting reciprocative movements of said pistons in either direction, said auxiliary means, when inactive, maintaining said locking means operative to prevent piston movement and, when active, operative to effect movement of said pistons through the locking means.

8. An actuator including, in combination, a cylinder, a pair of reciprocally movable pistons disposed in said cylinder capable of fluid pressure actuation in either direction, said pistons being operatively interconnected so as to move simultaneously in opposite directions upon actuation thereof, a pair of members disposed in said cylinder and operatively connected to said pistons, the operative connection between said pistons and members including a pair of elements attached to said pistons and operatively engaging said members whereby relative rotation will occur between said members and elements in response to reciprocative movements of said pistons, locking means operatively connected with said pistons for holding said pistons against movement when no fluid pressure is exerted upon said pistons, means for releasing said locking means upon application of fluid pressure to said cylinder, and auxiliary driving means operatively connected with said locking means for effecting reciprocative movements of said pistons in either direction, said auxiliary means, when inactive, maintaining said locking means operative to prevent piston movement and, when active, operative to effect movement of said pistons through the locking means by rotating said members.

9. An actuator including, in combination, a cylinder, a pair of reciprocative pistons in said cylinder capable of fluid pressure actuation in either direction, said pistons being operatively interconnected so as to move simultaneously in opposite directions upon actuation thereof, the operative interconnection between said pistons including a rod assembly disposed in said cylinder and operatively connected to said pistons whereby relative rotation will occur between said rod assembly and pistons in response to piston reciprocation, releasable locking means operatively associated with said pistons for holding them against movement when no fluid pressure is exerted upon said pistons, an auxiliary driving means operatively connected to said locking means for effecting reciprocative movements of said pistons, said auxiliary means, when inactive, maintaining said locking means operative to prevent movement of said pistons and, when active, operative to effect movement of said pistons through said locking means by rotating said rod assembly.

10. An actuator including, in combination, a cylinder, a pair of reciprocative pistons disposed in said cylinder capable of fluid pressure actuation in either direction, said pistons being operatively interconnected to move simultaneously in opposite directions upon actuation thereof, the operative connection between said pistons including a rod assembly extending axially through the pistons and operatively connected thereto for effecting rotation of the rod assembly in response to reciprocation of said pistons, releasable locking means engaging the rod assembly for holding it against movement when no fluid pressure is exerted upon said pistons, and auxiliary driving means operatively connected to said locking means, said auxiliary means, when inactive, holding said locking means against rotation and, when active, rotating said locking means for rotating the rod assembly and, consequently, reciprocating the pistons.

11. The combination set forth in claim 10 wherein the auxiliary driving means comprises a reversible electric motor operatively connected to the locking means, said auxiliary means, when inactive, operative to hold said locking means against rotation and, when active, operative to rotate the rod assembly through the engaged locking means.

12. An actuator including, in combination, a cylinder, a pair of lineally movable pistons in said cylinder capable of fluid pressure actuation in either direction, said pistons being operatively interconnected to move simultaneously in opposite directions upon actuation thereof, the operative interconnection between said pistons including a screw shaft assembly rotatably journaled in said cylinder and having left and right-hand threaded portions and a pair of nuts rigidly attached to said pistons having complementary threaded portions engaging said rod assembly whereby relative rotation will occur between said shaft assembly and nuts in response to linear movement of said pistons, locking means operatively associated with said shaft assembly for holding it against rotation when no fluid pressure is exerted upon said pistons, means operative upon application of fluid pressure to said cylinder for releasing said locking means to permit linear movement of said pistons in either direction, and auxiliary driving means operatively connected to said locking means for effecting linear movement of said pistons in either direction, said auxiliary means, when inactive, maintaining said locking means operative to prevent movement of said pistons and, when active, operative to effect movement of said pistons through the locking means by rotating said screw shaft assembly.

13. The combination set forth in claim 12 wherein the locking means include, a toothed edge of a ring member rotatably connected to said screw shaft assembly but adapted for longitudinal movement relative thereto, a rotatable worm gear having a toothed edge engageable with the toothed edge of said ring, and means urging the toothed portions into engagement in the absence of fluid pressure application to said cylinder, said worm gear having operative connection with said auxiliary driving means which are operative to hold the same against rotation when the auxiliary means are inactive.

14. The combination set forth in claim 13 wherein the means normally urging the toothed portions into engagement include, a grooved ring operatively connected to the ring having the toothed edge, a yoke having portions situated in the grooved ring, said yoke being attached to a rotatable member journaled in said cylinder, and a lever attached to said member, the free end of which is disposed between a pair of oppositely acting springs which normally center the lever to maintain engagement between the toothed portions of said locking means.

15. The combination set forth in claim 13 wherein the means for releasing the locking means include, a lock release cylinder, a lock release piston in said cylinder capable of linear movement under the urge of fluid pressure, and means operatively interconnecting said ring member and said piston whereby linear movement of said lock release piston under the urge of fluid pressure will effect longitudinal movement of said ring member such that the toothed portion thereof will be moved out of engagement with the toothed portion of said worm gear.

16. An actuator assembly including, in combination, a cylinder, a pair of reciprocative pistons in said cylinder, said pistons being operatively interconnected to move simultaneously in opposite directions, the operative interconnection between said pistons including a rod assembly rotatably journaled in said cylinder and a pair of elements attached to said pistons and operatively engaging said rod assembly such that relative rotation will occur between said rod assembly and elements in response to reciprocative movement of said pistons, and releasable locking means associated with said rod assembly for restraining said rod assembly against rotation and, consequently, holding said pistons against movement when said actuator is inactive.

17. A dual drive actuator including, in combination, a cylinder, a pair of lineally movable pistons in said cylinder capable of fluid pressure actuation in either direction, said pistons being operatively interconnected so as to move simultaneously in opposite directions upon actuation thereof, releasable locking means operatively associated with said pistons for holding said pistons against movement when no fluid pressure is exerted upon said pistons, and auxiliary means operatively connected to said pistons for effecting linear movements thereof in either direction with the locking means in the locked condition.

HOWARD M. GEYER.

References Cited in the file of this patent

UNITED STATES PATENTS

| Number | Name | Date |
|---|---|---|
| 254,741 | Walsh | Mar. 7, 1882 |
| 875,021 | Westbrook | Dec. 31, 1907 |
| 2,323,731 | Shetzline | July 6, 1943 |
| 2,455,090 | Pritchard | Nov. 30, 1948 |
| 2,512,119 | Stone et al. | June 20, 1950 |

FOREIGN PATENTS

| Number | Country | Date |
|---|---|---|
| 360,458 | Great Britain | Nov. 2, 1931 |